(12) United States Patent  
Pittore et al.

(10) Patent No.: US 7,831,965 B1  
(45) Date of Patent: Nov. 9, 2010

(54) METHOD AND APPARATUS FOR FACILITATING INTERMEDIATE LINKING OF BINARY FILES IN A VIRTUAL MACHINE

(75) Inventors: William F. Pittore, Lexington, MA (US); Antero K. P. Taivalsaari, Siivikkala (FI)

(73) Assignee: Oracle America, Inc., Redwood Shores, CA (US)

( * ) Notice: Subject to any disclaimer, the term of this patent is extended or adjusted under 35 U.S.C. 154(b) by 1069 days.

(21) Appl. No.: 10/918,674

(22) Filed: Aug. 12, 2004

(51) Int. Cl.
*G06F 9/44* (2006.01)
*G06F 9/45* (2006.01)

(52) U.S. Cl. .................. 717/165; 717/146; 717/162

(58) Field of Classification Search ......... 717/146–148, 717/162–167
See application file for complete search history.

(56) References Cited

U.S. PATENT DOCUMENTS 6,430,570 B1 * 8/2002 Judge et al. ............. 707/103 R
6,577,988 B1 * 6/2003 Travagline et al. .......... 702/188
2004/0236956 A1 * 11/2004 Shen et al. ................... 713/193

OTHER PUBLICATIONS

Lindholm and Yellin, "The Java Virtual Machine Specifcation", 1996 SunTM Microsystems, Inc. pp. 43-46,66-71,83-137,139-149,389-391.*
Levine "Linkers & Loaders", 2000, Morgan Kaufmann Publishers, pp. 153-159.*

* cited by examiner

*Primary Examiner*—Jason D Mitchell
(74) *Attorney, Agent, or Firm*—Park, Vaughan, Fleming & Dowler LLP

(57) ABSTRACT

One embodiment of the present invention provides a system that resolves references in an in-place execution file for a platform-independent virtual machine into physical addresses. During operation, the system receives an in-place execution file in which references have been replaced with in-place encoded metadata specifying attributes of the references. The system then resolves a reference by obtaining in-place encoded metadata for the reference from a location in the in-place execution file, using the in-place encoded metadata to determine an address of an associated referent, and then replacing the in-place encoded metadata at the location in the in-place execution file with the address of the referent.

21 Claims, 3 Drawing Sheets

METHOD AND APPARATUS FOR FACILITATING INTERMEDIATE LINKING OF BINARY FILES IN A VIRTUAL MACHINE

BACKGROUND

1. Field of the Invention

The present invention relates to computer systems that support virtual machines. More specifically, the present invention relates to a method and an apparatus that facilitates intermediate linking of binary files in a virtual machine.

2. Related Art

The Java 2 Platform, Micro Edition (J2ME™), has become very popular in the wireless device space. Motorola, Nokia, NTT DoCoMo, RIM, Siemens, and many other key players in the wireless device industry have recently started shipping J2ME-enabled devices in very high volume. It has been estimated that over 200 million J2ME-enabled mobile phones were shipped in 2003 alone.

However, in spite of the success of the J2ME platform, significant challenges for JAVA technology remain in the memory-constrained device space. One major limiting factor in J2ME application development is application size. With the deployment of more significant J2ME applications in mobile devices, J2ME application downloads will consume an increasingly large amount of wireless network bandwidth. Moreover, the runtime dynamic memory costs and application startup costs associated with anything but small J2ME applications are still excessive for most mass-market consumer devices, as well as for serious mobile systems software development in the JAVA programming language.

Cell phone manufacturers are under extreme price and power constraints. Providing more memory in a cell phone costs more money and uses more power. Reducing the amount of memory necessary to run JAVA applications would result in substantial savings for cell phone manufacturers.

However, reducing memory requirements for JAVA applications is not an easy task. Existing devices operate by loading a number of JAVA class files into memory, converting the classes into an internal format that the JAVA Virtual Machine (JVM) can execute, and then executing them. This process is not only time consuming, but consumes a great deal of memory as well.

Once the class files are converted to an internal format for the JVM, this internal format "image" can be stored. In this way, subsequent executions of the class files do not have to load the class files and convert them into the internal format again. The system can simply read in the already converted "image". However, this presents new problems.

There is no guarantee that the JVM will be loaded at the same virtual memory address as it was when the classes were converted into the binary "image". Moreover, the memory layout of the heap may not be exactly the same as when the binary "image" was created. Hence, the binary "image" may have pointers to locations in the JVM and the heap that are no longer valid.

Hence, what is needed is a method and an apparatus for resolving these references in a virtual machine.

SUMMARY

One embodiment of the present invention provides a system that resolves references in an in-place execution file for a platform-independent virtual machine into physical addresses. During operation, the system receives an in-place execution file in which references have been replaced with in-place encoded metadata specifying attributes of the references. The system then resolves a reference by obtaining in-place encoded metadata for the reference from a location in the in-place execution file, using the in-place encoded metadata to determine an address of an associated referent, and then replacing the in-place encoded metadata at the location in the in-place execution file with the address of the referent.

In a variation on this embodiment, the system uses the in-place encoded metadata to determine the address of the referent by obtaining a type, sub-type, and specific data from the in-place encoded metadata. The system then uses the type, sub-type, and specific data to retrieve the address of the referent.

In a further variation, using the type, sub-type, and specific data to retrieve the address of the referent involves using the specific data to lookup a class in a class list, wherein the specific data includes a class ID, and wherein the referent is a class. It also involves retrieving the address of the class from the class list.

In a variation on this embodiment, prior to resolving references in the in-place execution file, the system loads a collection of executable files and converts the collection of executable files into the in-place execution file.

In a further variation, the collection of executable files is a JAVA Archive File.

In a variation on this embodiment, the type can include text, data, and a heap.

In a variation on this embodiment, the sub-type can include a task mirror, a Java near, or an instance class.

In a variation on this embodiment, the platform-independent virtual machine is a JAVA Virtual Machine.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and does not include computer instruction signals embodied in a transmission medium.

Memory-Constrained Computing Device

Figure 1:
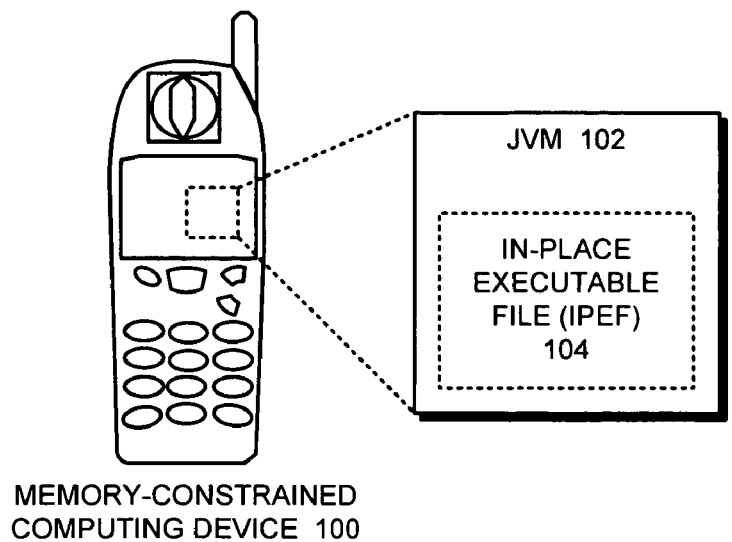
FIG. 1 illustrates a memory-constrained computing device in accordance with an embodiment of the present invention.

FIG. 1 illustrates a memory-constrained computing device 100 in accordance with an embodiment of the present invention. Memory-constrained computing device 100 can include any type of computing device, including, but not limited to, a cell phone, a computer system based on a microprocessor, a digital signal processor, a portable computing device, a personal organizer, a device controller, and a computational engine within an appliance. Memory-constrained computing device 100 contains JAVA Virtual Machine (JVM) 102, which in turn supports execution of In-Place Executable File (IPEF) 104. (The terms JAVA, JVM and JAVA VIRTUAL MACHINE are trademarks of SUN Microsystems, Inc. of Santa Clara, Calif.) Note that JVM 102 could be any type of platform-independent virtual machine, and is not meant to be limited to a JAVA Virtual Machine.

Intermediate Linking

Figure 2:
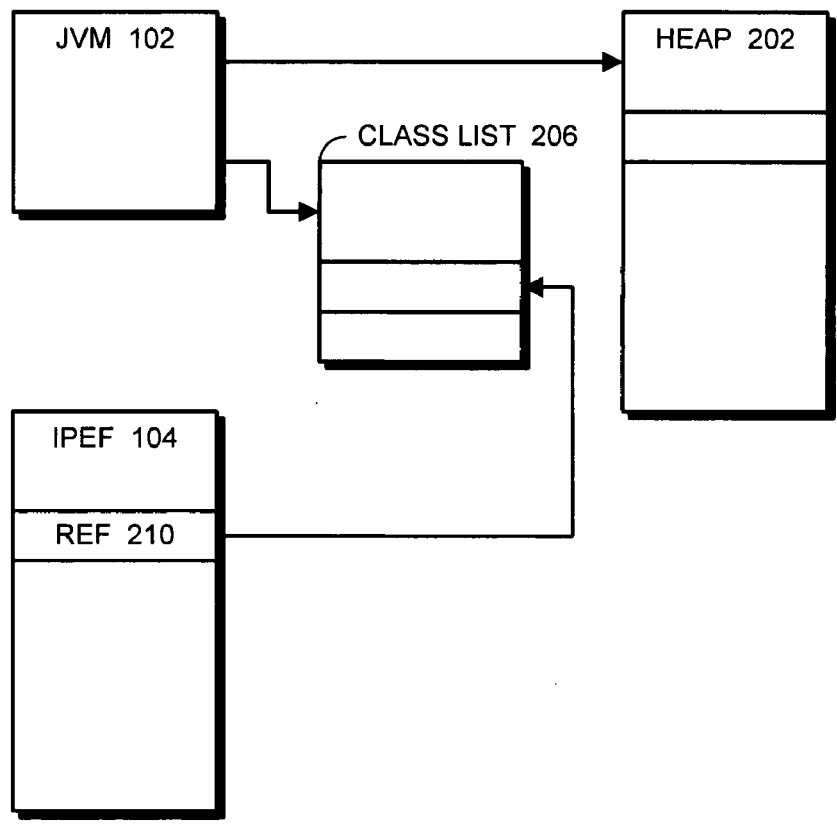
FIG. 2 illustrates an intermediate linking process for an in-place execution file in accordance with an embodiment of the present invention.

FIG. 2 illustrates the intermediate linking process for IPEF 104 in accordance with an embodiment of the present invention. When linking a binary class file image (IPEF 104) that has been created from a set of JAVA class files into a JVM, the JAVA class files need to be converted into a binary format that can be used by the particular JVM. Depending on the implementation of the JVM, the binary format will most likely be different from one vendor's mobile device to another. If the JVM can load a binary image directly into its address space, then startup time for an application will be much quicker. However, if a binary image is already stored on the device, the binary image may not be able to run because it may have references to addresses in the JVM that have changed.

One way to remedy this problem is to download the original JAVA class files again, convert them into a new binary image, and store the new binary image. This process would have to do be repeated every time the VM changed. On a desktop system, this is not a problem because a large amount of memory and storage space is available for performing the conversion. In such a system, one can store the original JAVA class files and the JVM can convert them each time it runs. However, on a mobile device, such as memory-constrained computing device 100, storage is very limited and a binary image has the potential to be smaller than the original class files.

Furthermore, the process of converting an application into a binary image may take many seconds on a phone, which can be very annoying to a user of the application. In contrast, the loading of the binary image may take only a few hundreds of milliseconds, and the linking/relocation process may take 10 or so milliseconds. It is consequently very advantageous to have an image of the application in binary form, and to be able to relocate the image in memory regardless of where the VM or the binary image is loaded (address-wise).

One embodiment of the present invention uses a two-stage conversion process to convert JAVA class files into a binary image that is ready to execute. The first stage of the conversion process converts a JAVA class file into a standard binary form (IPEF 104) which is stored locally on memory-constrained computing device 100. When JVM 102 attempts to execute IPEF 104, JVM 102 performs the second, much smaller stage of the conversion process on IPEF 104 so that JVM 102 can execute IPEF 104 directly. The changes that occur during this second stage of the conversion process are much easier than the changes that occur during the first stage of the conversion process. Typically, this second stage involves linking unresolved addresses that exist in IPEF 104 to proper corresponding locations in JVM 102.

Consider the example illustrated in FIG. 2 in which IPEF 104 has already been through the initial conversion to a binary image. When JVM 102 executes IPEF 104, IPEF 104 needs to be converted to resolve references within IPEF 104. A typical reference in IPEF 104 could be a reference to a particular JAVA class. In the example illustrated in FIG. 2, IPEF 104 contains reference 210 that includes "in-place encoded metadata" that facilitates resolving reference 210 to the proper corresponding location in heap 202. Reference 210, for example, could contain a class ID for the JAVA class, which the system uses to lookup the location of the JAVA class within heap 202 in class list 206.

In-Place Execution File

Figure 3:
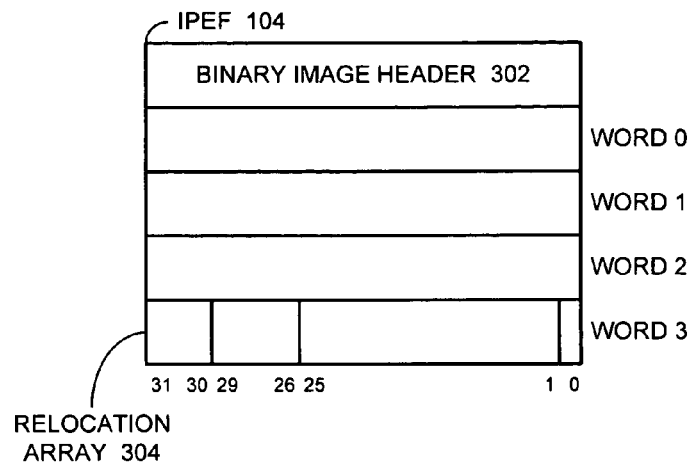
FIG. 3 illustrates an in-place execution file in accordance with an embodiment of the present invention.

FIG. 3 illustrates an In-Place Execution File 104 in accordance with an embodiment of the present invention. IPEF 104 includes binary image header 302, and a sequence of words. References to be resolved in IPEF 104 contain in-place encoded metadata 304.

In-Place Encoded Metadata

Figure 4:
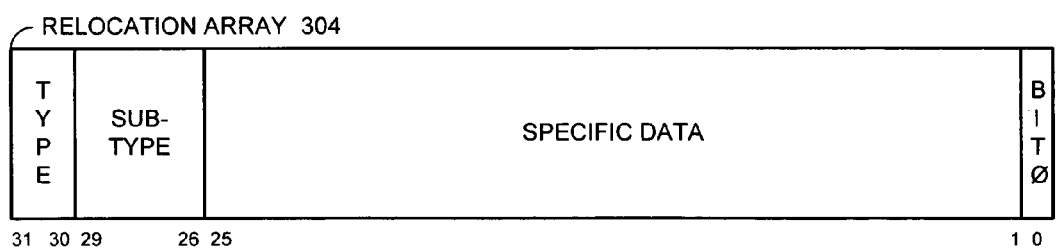
FIG. 4 illustrates in-place encoded metadata in accordance with an embodiment of the present invention.

FIG. 4 illustrates in-place encoded metadata 304 in accordance with an embodiment of the present invention. In this example, the in-place encoded metadata 304 resides within a 32-bit word. If bit 0==1, then the type bits can indicate either Text, Data, or Heap. If the type bits indicate Heap, then the sub-type bits indicate the type of Heap reference being relocated, such as InstanceClass or JavaNear. The bits indicating specific data are sub-type specific. For example, if the sub-type is InstanceClass or JavaNear, then the specific data can be the class ID.

If bit 0==0, then bits 1-29 define an offset within IPEF 104 that needs to be adjusted based on the difference between the absolute address of IPEF 104 at creation, and the load address of IPEF 104.

Resolving References

Figure 5:
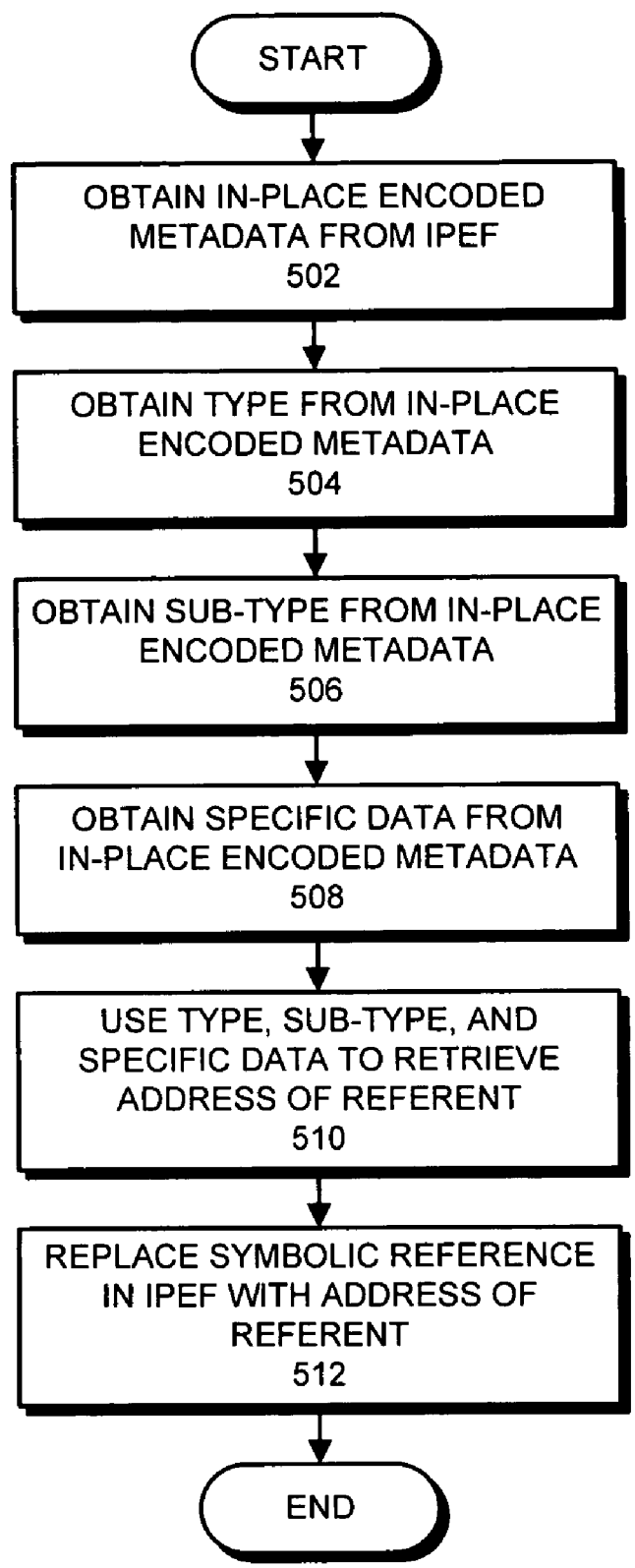
FIG. 5 illustrates the process of resolving references within an in-place executable file in accordance with an embodiment of the present invention.

FIG. 5 illustrates the process of resolving references within IPEF 104 in accordance with an embodiment of the present invention. The system starts by retrieving in-place encoded metadata 304 from IPEF 104 (step 502). Next, the system obtains the type of reference from in-place encoded metadata 304 (step 504). Depending on the type of reference, the system also obtains a sub-type of the reference from in-place encoded metadata 304 (step 506). For example, if the type is Heap, the sub-type can be InstanceClass or JavaNear. The system also obtains the specific data from in-place encoded metadata 304 (step 508), which is dependent on the sub-type. For example, if the sub-type is InstanceClass or JavaNear, then the specific data is the class ID.

Once the type, sub-type and specific data have been retrieved from in-place encoded metadata 304, the system uses the type, sub-type and specific data to retrieve the address of the referent (step 510). Once the address of the referent is known, the system replaces the symbolic reference in IPEF 104 with the address of the referent (step 512).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for executing a JAVA application using a platform-independent virtual machine installed in a memory-constrained device, comprising:

receiving an in-place execution file in the memory-constrained device, wherein the in-place execution file is a standard binary image file of the JAVA application comprising a sequence of words, and wherein one or more words in the sequence comprise an unresolved reference that includes in-place encoded metadata specifying attributes of the reference;

resolving a reference within a word in the in-place execution file by, obtaining the in-place encoded metadata in the word for the unresolved reference;

if a first bit in the in-place encoded metadata has a first value indicating that the in-place encoded metadata includes an offset, replacing an existing offset in the in-place encoded metadata with an adjusted offset, wherein the adjusted offset is computed by summing the existing offset and a difference between an address of the in-place execution file at creation and a load address of the in-place execution file, or if the first bit in the in-place encoded metadata has a second value indicating that the in-place encoded metadata includes a symbolic reference, obtaining a type from the in-place encoded metadata;

obtaining a sub-type from the in-place encoded metadata, wherein the sub-type is interpreted based on the obtained type;

obtaining specific data from the in-place encoded metadata, wherein the specific data is interpreted based on the obtained sub-type; and using the type, the subtype, and the specific data to look up an address of the referent; and replacing the symbolic reference in the in-place encoded metadata with the address; and executing the in-place execution file in the memory-constrained device.

2. The method of claim 1, wherein prior to resolving references in the in-place execution file, the method further comprises:

loading a collection of executable files; and converting the collection of executable files into the in-place execution file.

3. The method of claim 2, wherein the collection of executable files is a JAVA Archive File.

4. The method of claim 1, wherein the type includes at least one of:

text;

data; and a heap.

5. The method of claim 1, wherein the sub-type includes an instance class.

6. The method of claim 1, wherein the platform-independent virtual machine is a JAVA Virtual Machine.

7. The method of claim 1, wherein using the type, the subtype, and the specific data to look up an address of the referent comprises:

using the specific data to look up a class in a class list, wherein the specific data includes a class ID, and wherein the referent is a class; and retrieving the address of the class from the class list.

8. A computer-readable storage medium storing instructions that when executed by a computer cause the computer to perform a method for executing a JAVA application using a platform-independent virtual machine installed in a memory-constrained device, the method comprising:

receiving the in-place execution file in the memory-constrained device, wherein the in-place execution file is a standard binary image file of the JAVA application comprising a sequence of words, and wherein one or more words in the sequence comprise an unresolved reference that includes in-place encoded metadata specifying attributes of the reference;

resolving a reference within a word the in-place execution file by, obtaining the in-place encoded metadata in the word for the unresolved reference;

a first bit in the in-place encoded metadata has a first value indicating that the in-place encoded metadata includes an offset, replacing an existing offset in the in-place encoded metadata with an adjusted offset, wherein the adjusted offset is computed by summing the existing offset and a difference between an address of the in-place execution file at creation and a load address of the in-place execution file, or if the first bit in the in-place encoded metadata has a second value indicating that the in-place encoded metadata includes a symbolic reference, obtaining a type from the in-place encoded metadata;

obtaining a sub-type from the in-place encoded metadata, wherein the sub-type is interpreted based on the obtained type;

obtaining specific data from the in-place encoded metadata, wherein the specific data is interpreted based on the obtained sub-type; and using the type, the subtype, and the specific data to look up an address of the referent; and replacing the symbolic reference in the in-place encoded metadata with the address; and executing the in-place execution file in the memory-constrained device.

9. The computer-readable storage medium of claim 8, wherein prior to resolving references in the in-place execution file, the method further comprises:

loading a collection of executable files; and converting the collection of executable files into the in-place execution file.

10. The computer-readable storage medium of claim 9, wherein the collection of executable files is a JAVA Archive File.

11. The computer-readable storage medium of claim 8, wherein the type includes at least one of:

text;

data; and a heap.

12. The computer-readable storage medium of claim 8, wherein the sub-type includes an instance class.

13. The computer-readable storage medium of claim 8, wherein the platform-independent virtual machine is a JAVA Virtual Machine.

14. The computer-readable storage medium of claim 8, wherein using the type, the subtype, and the specific data to look up an address of the referent comprises:

using the specific data to look up a class in a class list, wherein the specific data includes a class ID, and wherein the referent is a class; and retrieving the address of the class from the class list.

15. An apparatus for executing a JAVA application using a platform-independent virtual machine installed in a memory-constrained device, comprising:
- a processor;
- a memory;
- a receiving mechanism configured to receive the in-place execution file in the memory-constrained device, wherein the in-place execution file is a standard binary image file of the JAVA application comprising a sequence of words; and wherein one or more words in the sequence comprise an unresolved reference that includes in-place encoded metadata specifying attributes of the reference;
- a resolution mechanism configured to resolve a reference within a word in the in-place execution file by,
  - obtaining the in-place encoded metadata in the word for the unresolved reference;
    - if a first bit in the in-place encoded metadata has a first value indicating that the in-place encoded metadata includes an offset, replacing an existing offset in the in-place encoded metadata with an adjusted offset, wherein the adjusted offset is computed by summing the existing offset and a difference between an address of the in-place execution file at creation and a load address of the in-place execution file, or
    - if the first bit in the in-place encoded metadata has a second value indicating that the in-place encoded metadata includes a symbolic reference,
      - obtaining a type from the in-place encoded metadata;
      - obtaining a sub-type from the in-place encoded metadata, wherein the sub-type is interpreted based on the obtained type;
      - obtaining specific data from the in-place encoded metadata, wherein the specific data is interpreted based on the obtained sub-type; and
      - using the type, the subtype, and the specific data to look up an address of the referent; and
      - replacing the symbolic reference in the in-place encoded metadata with the address; and
- an execution mechanism configured to execute the in-place execution file in the memory-constrained device.

16. The apparatus of claim 15, further comprising:
- a loading mechanism configured to load a collection of executable files; and
- a conversion mechanism configured to convert the collection of executable files into the in-place execution file.

17. The apparatus of claim 16, wherein the collection of executable files is a JAVA Archive File.

18. The apparatus of claim 15, wherein the type includes at least one of:
- text;
- data; and
- a heap.

19. The apparatus of claim 15, wherein the sub-type includes
- an instance class.

20. The apparatus of claim 15, wherein the platform-independent virtual machine is a JAVA Virtual Machine.

21. The apparatus of claim 15, wherein using the type, the subtype, and the specific data to look up an address of the referent comprises:
- using the specific data to look up a class in a class list, wherein the specific data includes a class ID, and wherein the referent is a class; and
- retrieving the address of the class from the class list.

* * * * *